US006647741B2

(12) United States Patent
Pechous et al.

(10) Patent No.: US 6,647,741 B2
(45) Date of Patent: Nov. 18, 2003

(54) UTENSIL COOLING SYSTEM

(76) Inventors: John B. Pechous, 5154 W. Linda La., Chandler, AZ (US) 85226; Mark A. Yeary, 2097 E. Linda La., Gilbert, AZ (US) 85234

( * ) Notice: Subject to any disclaimer, the term of this patent is extended or adjusted under 35 U.S.C. 154(b) by 0 days.

(21) Appl. No.: 10/038,250

(22) Filed: Oct. 29, 2001

(65) Prior Publication Data

US 2003/0079492 A1 May 1, 2003

(51) Int. Cl.⁷ ................................................ F25D 3/08
(52) U.S. Cl. ...................... 62/457.6; 62/372; 220/592.2
(58) Field of Search ..................... 62/457.6, 457.2, 62/372, 529; 220/592.01, 592.03, 592.09, 592.15, 592.16, 592.17, 592.2, 592.25

(56) References Cited

U.S. PATENT DOCUMENTS

| | | | | |
|---|---|---|---|---|
| 4,335,781 A | * | 6/1982 | Duffy | 165/104.21 |
| 4,722,299 A | * | 2/1988 | Mohr | 119/707 |
| 5,082,115 A | * | 1/1992 | Hutcheson | 206/545 |
| 5,088,301 A | * | 2/1992 | Piepenbrink | 62/457.1 |
| 5,343,360 A | * | 8/1994 | Sanwo | 361/707 |
| 5,520,014 A | * | 5/1996 | Laugier | 62/457.2 |
| 5,704,480 A | * | 1/1998 | Scholz et al. | 206/438 |
| 5,718,124 A | * | 2/1998 | Senecal | 62/3.6 |
| 6,058,636 A | * | 5/2000 | Colkmire | 40/630 |
| 6,059,143 A | * | 5/2000 | Weir | 222/61 |
| 6,115,932 A | * | 9/2000 | Fedora | 33/758 |
| 6,196,017 B1 | * | 3/2001 | Chapman | 62/372 |
| 6,244,065 B1 | * | 6/2001 | Wuestman | 220/23.4 |
| 6,253,570 B1 | * | 7/2001 | Lustig | 62/457.2 |
| 6,363,886 B1 | * | 4/2002 | Statton | 119/51.5 |
| 6,378,325 B1 | * | 4/2002 | Yang | 62/371 |

OTHER PUBLICATIONS

US 2001/0011459 A1 to Rudrick.*

* cited by examiner

Primary Examiner—William E. Tapolcai
Assistant Examiner—Mohammad M Ali
(74) Attorney, Agent, or Firm—Martin L. Stoneman

(57) ABSTRACT

A cooling system, for cooling the contents of a utensil, utilizing a removable, reusable, refillable, freezable toroidal-shaped cooling insert and a toroidal-shaped insulator. The cooling insert and insulator stack in a nested manner within the utensil to provide improved insulating and longer cooling of the utensil contents. Furthermore, a secured bottom holder removably holds the cooling insert and insulator within the utensil. The cooling system includes the use of a temperature sensor and display which provides a visual indicator when the contents have reached a temperature indicating the contents are no longer being properly cooled. Such utensils may include, for example, dog dishes, bait containers and food containers.

41 Claims, 8 Drawing Sheets

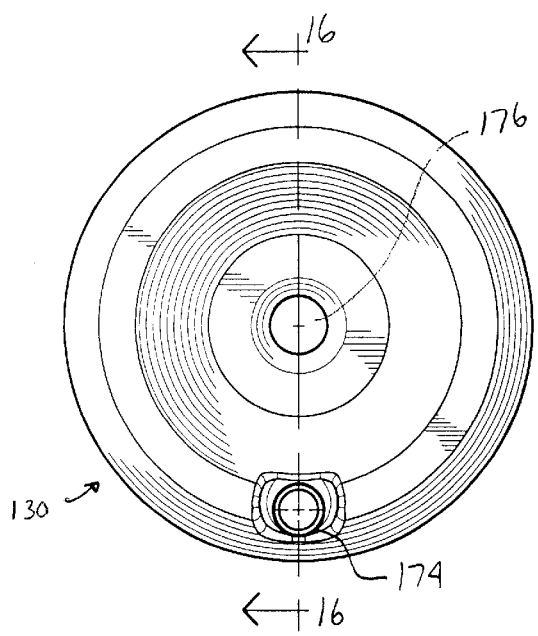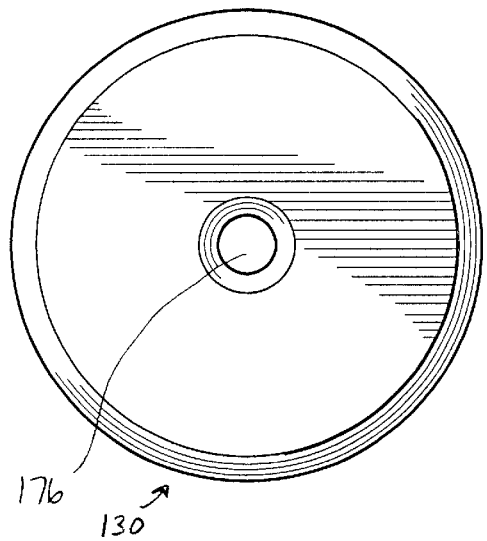
FIG. 13  FIG. 14
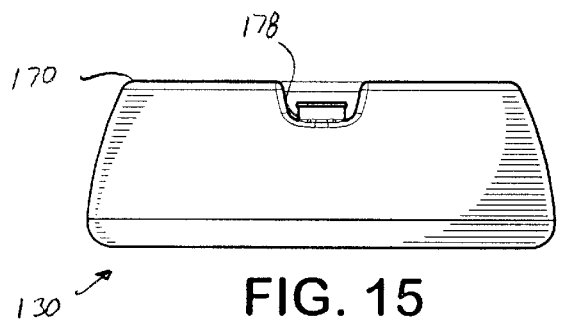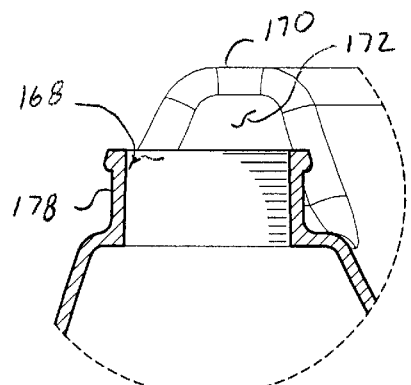
FIG. 15
FIG. 17
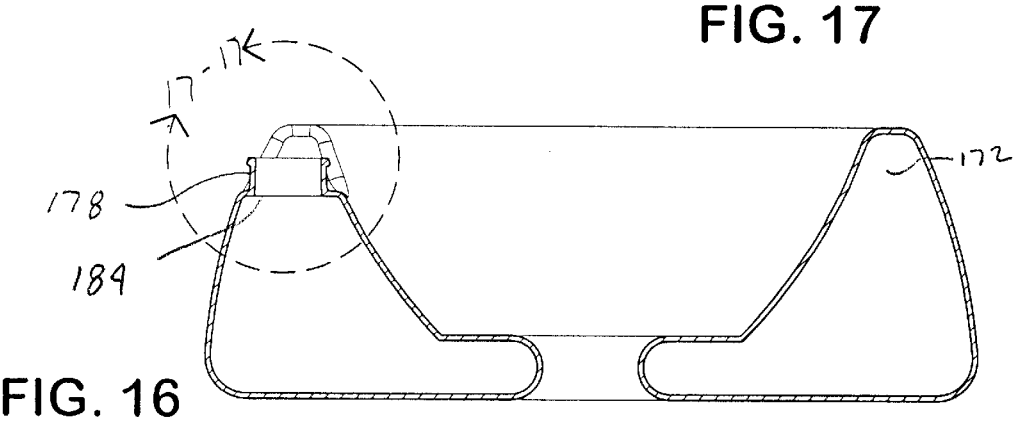
FIG. 16

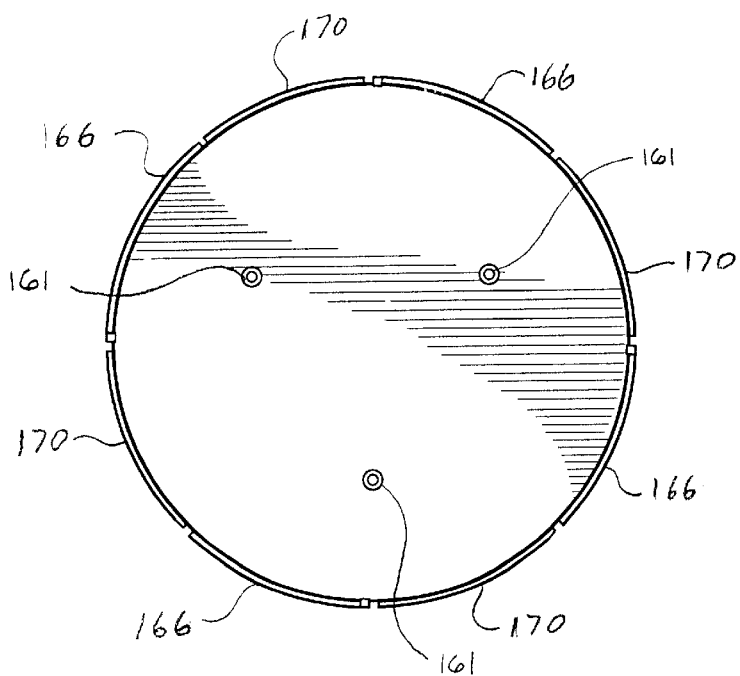
FIG. 18
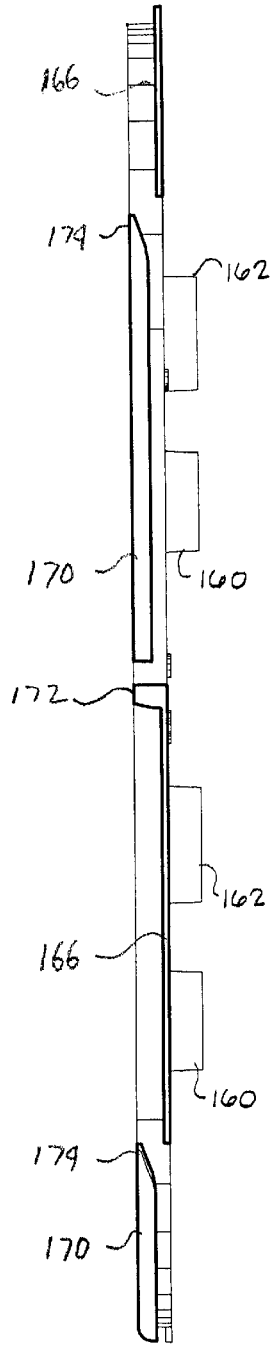
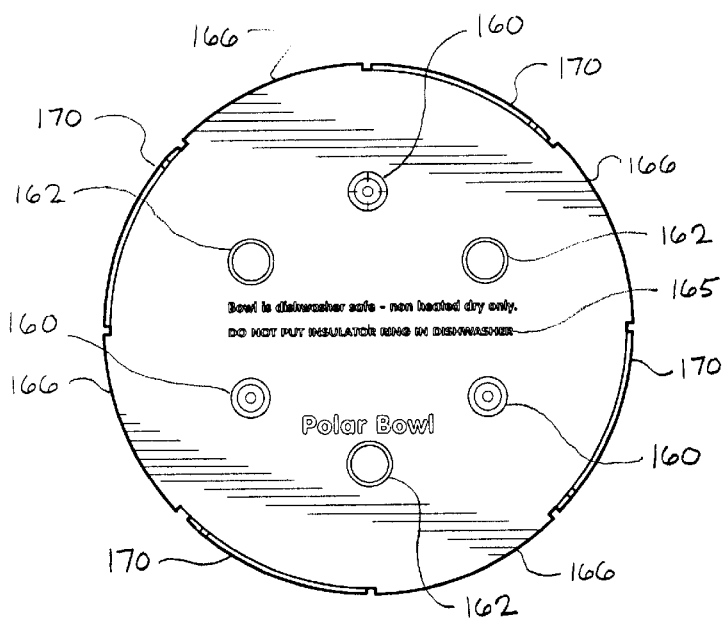
FIG. 19
FIG. 20

UTENSIL COOLING SYSTEM

BACKGROUND

This invention relates to providing a cooling system comprising a removable, reusable, refillable freezable cooling insert and insulator for improved cooling of utensils or containers, for example, such as those which may be used to cool a dog/pet dish, a bait container or a food container.

Typically, in warm and hot weather, there have been problems in keeping the contents of containers cool over an extended period of time, especially such items as water in a pet dish. Such containers typically have little or no cooling mechanism and those with a cooling mechanism typically have little or no insulation. Such containers utilize cooling means; however, they tend to be either too expensive or relatively inefficient to use and clean, etc.

OBJECTS OF THE INVENTION

A primary object and feature of the present invention is to provide a system for cooling the contents of utensils, which provides a removable, reusable toroidal cooling container. It is a further object and feature of the present invention to provide such a system, wherein the cooling container is a freezable cooling container. It is a further object and feature of the present invention to provide such a system wherein such cooling container is refillable with water (preferably) or other freezable cooling medium. It is a further object and feature of the present invention to provide such a system which is more efficient in the transfer of heat and cooling than those of the prior art. It is a further object and feature of the present invention to provide such a system which provides a removable toroidal insulator. It is a further object and feature of the present invention to provide such a system which provides removable toroidal component nesting for nesting the removable cooling container and the removable insulator within the utensil. It is a further object and feature of the present invention to provide such a system which provides a temperature sensing and display device.

A further primary object and feature of the present invention is to provide such a system which is efficient, inexpensive, and handy. Other objects and features of this invention will become apparent with reference to the following descriptions.

SUMMARY OF THE INVENTION

In accordance with a preferred embodiment hereof, this invention provides a cooling system for cooling a substance contained by a utensil comprising, in combination: a substantially toroidal cooling means for cooling the substance; a container means, comprising an outer portion and an inner portion, for containing the substance within such outer portion and containing such cooling means within such inner portion; and at least one holder means, for holding such substantially toroidal cooling means within such inner portion of such container means. It also provides such a system further comprising: a substantially toroidal insulating means for insulating such inner portion from such outer portion; wherein such at least one holder means is also for holding such substantially toroidal insulating means.

Further, it provides such a system wherein: such substantially toroidal insulating means is substantially nested adjacent such inner portion; and such substantially toroidal cooling means is substantially nested adjacent such substantially toroidal insulating means. And, it provides such a system further comprising a temperature sensor and display means for displaying the temperature of the substance. It also provides such a system further comprising a temperature sensor and display means for displaying the temperature of the substance. And, it provides such a system wherein such substantially toroidal cooling means comprises a reservoir means for containing a freezable coolant.

Even further, it provides such a system wherein such substantially toroidal cooling means comprises a removable seal means for removably sealing such reservoir means. It also provides such a system wherein such at least one holder means is also for holding a removable bottom to such container means. And, it provides such a system further comprising attachment means for removably attaching such removable bottom to such container means. Still further, it provides such a system wherein such at least one holder means further comprises gripping means for assisting gripping such removable bottom. It also provides such a system wherein such substantially toroidal insulating means is removably contained within such inner portion. It even provides such a system wherein such substantially toroidal cooling means is removably contained within such inner portion.

Additionally, in accordance with a preferred embodiment hereof, this invention provides a cooling system for cooling a substance contained by a utensil comprising, in combination: a substantially toroidal cooler structured and arranged to cool the substance; a container, comprising an outer portion and an inner portion, structured and arranged to contain the substance within such outer portion and contain such cooler within such inner portion; and at least one holder, structured and arranged to hold such substantially toroidal cooler within such inner portion of such container. It also provides such a system further comprising: a substantially toroidal insulator structured and arranged to insulate such inner portion from such outer portion; wherein such at least one holder is also for holding such substantially toroidal insulator.

Moreover, it also provides such a system wherein: such substantially toroidal insulator is substantially nested adjacent such inner portion; and such substantially toroidal cooler is substantially nested adjacent such substantially toroidal insulator. Also, it provides such a system further comprising a temperature sensor and display structured and arranged to display the temperature of the substance. And, it provides such a system wherein such outer portion comprises a bowl, having a bottom. Further, it provided such a system wherein such temperature sensor and display is structured and arranged to be placed at about the bottom of such bowl. It also provides such a system wherein such temperature sensor and display resembles a snowflake.

Furthermore, it provides such a system further comprising a temperature sensor and display structured and arranged to display the temperature of the substance. Even further, it provides such a system wherein such substantially toroidal cooler comprises a reservoir structured and arranged to contain a freezable coolant. It also provides such a system wherein such freezable coolant is water; and, wherein such freezable coolant is a freezable gel. Still further, it provides such a system wherein such substantially toroidal cooler comprises a removable seal structured and arranged to removably seal such reservoir. And, it provides such a system wherein such reservoir is capable of holding about 50 ounces of freezable coolant. Also, it provides such a system wherein such substantially toroidal cooler comprises a fill opening with a removable seal for removably sealing such fill-opening.

Additionally, it provides such a system wherein such fill-opening is located below a top portion of such substantially toroidal cooler such that when such substantially toroidal cooler is placed on a level surface and such reservoir is filled with such freezable coolant, to the top of such fill-opening, an air space remains in such reservoir. And, it provides such a system wherein such at least one holder is also structured and arranged to hold a removable bottom to such container. It even provides such a system further comprising an attacher structured and arranged to removably attach such removable bottom to such container. Further, it provides such a system wherein such at least one holder further comprises at least one grip structured and arranged to assist gripping such removable bottom. Even further, it provides such a system wherein such substantially toroidal insulator is removably contained within such inner portion. Still further, it provides such a system wherein such substantially toroidal cooler is removably contained within such inner portion.

Even further, it provides such a system wherein such attacher further comprises: at least one first tab attached to an underside of such container; at least one second tab attached to such removable bottom; and at least one third tab attached to such removable bottom; wherein such at least one second tab and such at least one third tab are structured and arranged to allow such at least one first tab to be inserted between such at least one second tab and such at least one third tab; wherein twisting of such removable bottom causes such at least one first tab to slide below such at least one second tab and above such at least one third tab; and wherein such removable bottom is held in place and removably attached to such container.

Still further, it provides such a system wherein such substantially toroidal insulator comprises polystyrene. And, it provides such a system wherein such outer portion comprises indicia; and, wherein such indicia resembles an igloo. It also provides such a system wherein such holder comprises indicia. Further, it provides such a system wherein such removable bottom comprises indicia.

In accordance with a preferred embodiment hereof, this invention provides a cooling system for cooling water contained by a pet dish comprising, in combination: a container, comprising, an outer portion having a bowl, and an inner portion; a substantially toroidal insulator; a substantially toroidal cooler, comprising, a reservoir, and a fill-opening with a removable seal for removably sealing such fill-opening, wherein such fill-opening is located below a top portion of such substantially toroidal cooler such that when such substantially toroidal cooler is placed on a level surface and such reservoir is filled with such freezable coolant, to the top of such fill-opening, an air space remains in such reservoir; and at least one removable bottom structured and arranged to removably hold such substantially toroidal insulator and such substantially toroidal cooler within such inner portion of such container; wherein such substantially toroidal insulator is substantially nested adjacent such inner portion, and such substantially toroidal cooler is substantially nested adjacent such substantially toroidal insulator.

Additionally, it provides such a system wherein: such bowl holds about a quart of the water; such substantially toroidal insulator comprises a thickness of about one-half to about one inch thick polystyrene; and wherein such reservoir is capable of holding about 50 ounces of a freezable coolant. It even provides such a system wherein such removable bottom further comprises: at least one first tab attached to an underside of such container, at least one second tab attached to such removable bottom, and at least one third tab attached to such removable bottom; wherein such at least one second tab and such at least one third tab are structured and arranged to allow such at least one first tab to be inserted between such at least one second tab and such at least one third tab; wherein twisting of such removable bottom causes such at least one first tab to slide below such at least one second tab and above such at least one third tab; and wherein such removable bottom is held in place and removably attached to such container.

BRIEF DESCRIPTION OF THE DRAWINGS

FIG. 13 is a top view of the coolant container of the utensil cooling system of FIG. 6 according to a preferred embodiment of the present invention.

FIG. 14 is a bottom view of the coolant container of the utensil cooling system of FIG. 13 according to a preferred embodiment of the present invention.

FIG. 15 is a side view of the coolant container of the utensil cooling system of FIG. 13 according to a preferred embodiment of the present invention.

FIG. 16 is a sectional view through section 16—16 of FIG. 13.

FIG. 17 is an enlarged detail view through section 9—9 of FIG. 16.

FIG. 18 is a top view of the bottom plate of the utensil cooling system of FIG. 6 according to a preferred embodiment of the present invention.

FIG. 19 is a bottom view of the bottom plate of the utensil cooling system of FIG. 13 according to a preferred embodiment of the present invention.

FIG. 20 is a side view of the bottom plate of the utensil cooling system of FIG. 13 according to a preferred embodiment of the present invention.

DETAILED DESCRIPTION OF A PREFERRED EMBODIMENT OF THE INVENTION

Figure 1:
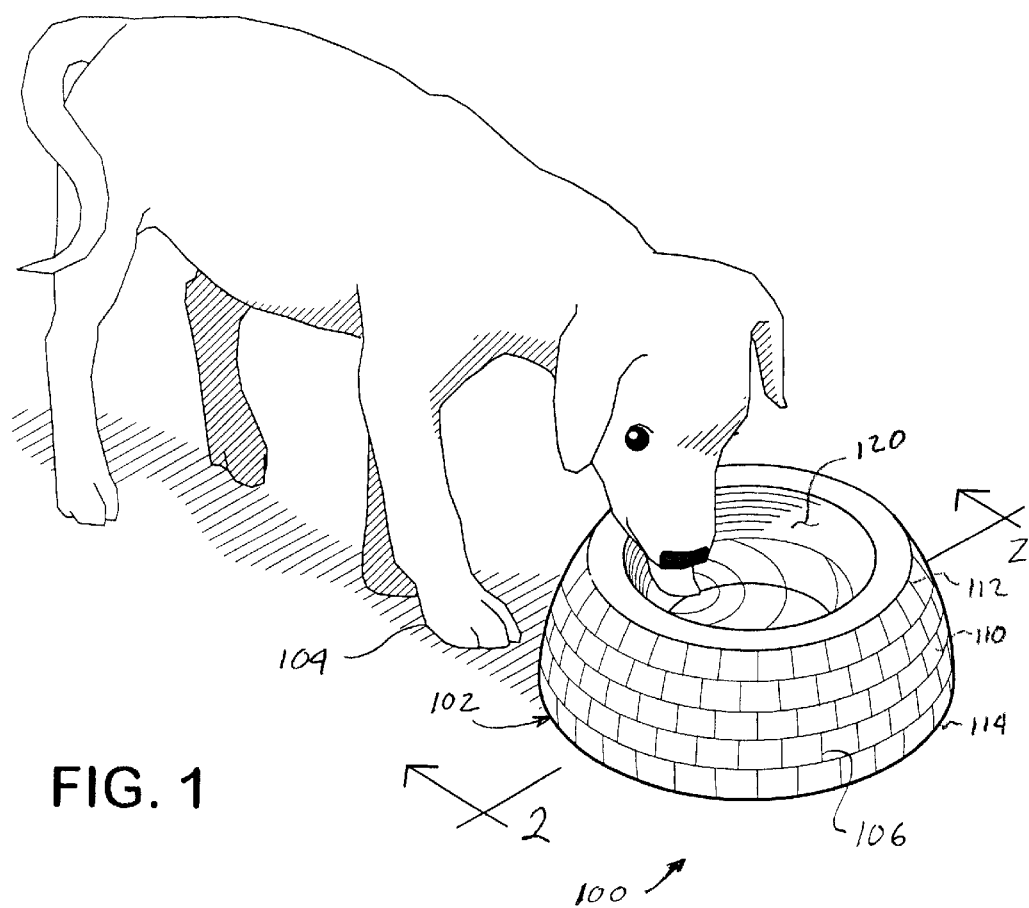
FIG. 1 is a perspective view of a utensil cooling system according to a preferred embodiment of the present invention.

Reference is now made to the drawings. FIG. 1 is a perspective view of the utensil cooling system 100 according to a preferred embodiment of the present invention. Illustrated is a utensil 102 used for providing cooled water for a pet 104. Such a utensil 102 may be also used to provide cooled food or other substance to an animal or human. Preferably, utensil 102 comprises exterior indicia 106 (embodying herein wherein such outer portion comprises indicia). Preferably, exterior indicia 106 of various kinds may be used to make the utensil 102 more desirable to a buyer or user, for example, an igloo design, as shown (embodying herein wherein such indicia resembles an igloo). Preferably, the color of the indicia 106 may also assist in reflecting sunlight or heat, for example, use of a white reflective coating.

Figure 2:
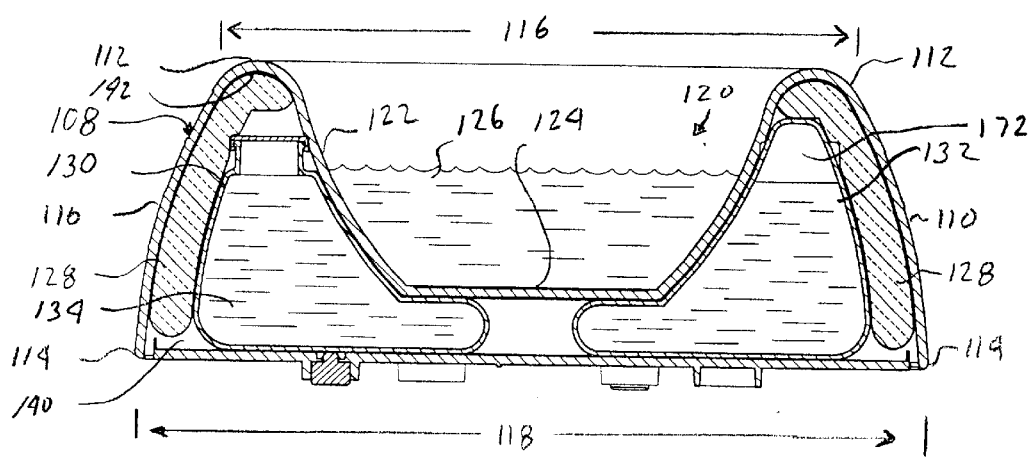
FIG. 2 is a sectional view through the section 2—2 of FIG.

FIG. 2 is a sectional view through the section 2—2 of FIG. 1. Preferably, utensil 102 comprises an outer shell 108 and an inner portion 142 (the above described arrangement embodying herein a container means, comprising an outer portion and an inner portion, for containing the substance within such outer portion and containing such cooling means within such inner portion; and embodying herein a container, comprising an outer portion and an inner portion, structured and arranged to contain the substance within such outer portion and contain such cooler within such inner portion). Preferably, the outer shell 108 is bowl-shaped being slightly convex along the exterior sides 110 from top 112 to bottom 114 and having a smaller diameter top portion 116 and a wider diameter bottom portion 118, along the exterior. Preferably, the above arrangement is one of the elements of the present invention that assists in providing for a more stable utensil 102, one that will resist lateral movement and spilling when being used. This feature is particularly useful when a pet 104 uses the utensil 102. Under appropriate circumstances other arrangements may suffice. Preferably outer shell 108 comprises a central bowl 120. Preferably, central bowl 120 has sloping sides 122 and a substantially flat bottom 124 (embodying herein wherein such outer portion comprises a bowl, having a bottom), as shown. Under appropriate circumstances, other arrangements may suffice. Preferably, central bowl 120 is unitary to the outer shell 108 and will hold liquids, such as water 126, without leaking. Preferably, central bowl 120 will hold about a quart of liquid.

Figure 3:
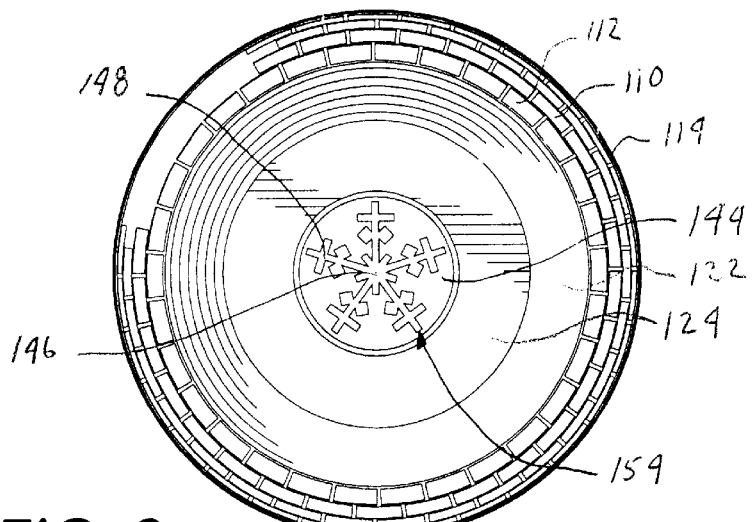
FIG. 3 is a top view of the utensil cooling system of FIG. 1 according to a preferred embodiment of the present invention.

Preferably, utensil 102 further comprises an insulator 128. Preferably, insulator 128 comprises a toroidal shape (embodying herein a substantially toroidal insulating means for insulating such inner portion from such outer portion; and embodying herein a substantially toroidal insulator structured and arranged to insulate such inner portion from such outer portion). Preferably, insulator 128 is removably inserted into utensil 102 (embodying herein wherein such substantially toroidal insulating means is removably contained within such inner portion; and wherein such substantially toroidal insulator is removably contained within such inner portion). Insulator 128 will be further detailed in FIG. 6 and FIGS. 10–12. Preferably, utensil 102 further comprises a cooling container 130. Preferably, cooling container 130 is toroidal in shape (embodying herein a substantially toroidal cooling means for cooling the substance; and embodying herein a substantially toroidal cooler structured and arranged to cool the substance). Preferably, cooling container 130 is removably inserted into utensil 102 (embodying herein wherein such substantially toroidal cooling means is removably contained within such inner portion; and embodying herein wherein such substantially toroidal cooler is removably contained within such inner portion). Preferably, cooling container 130 comprises a reservoir 132 which will hold a freezable coolant 134 (embodying herein wherein such substantially toroidal cooling means comprises a reservoir means for containing a freezable coolant; and, wherein such substantially toroidal cooler comprises a reservoir structured and arranged to contain a freezable coolant). Preferably, the coolant 134 is water (embodying herein wherein such freezable coolant is water); however, under appropriate circumstances other coolants may suffice, for example, a freezable gel (embodying herein wherein such freezable coolant is a freezable gel). Preferably, reservoir 132 will hold about 50 ounces of freezable coolant. Cooling container 130 will be further detailed in FIG. 6 and FIGS. 13–17. Preferably, utensil 102 further comprises a bottom 136. Preferably, bottom 136 attaches to outer shell 108 and assists in containing or holding insulator 128 and cooling container 130 within the inner hollow cavity 140 (see FIG. 8) that is the inner portion 142 of the outer shell 108 (this arrangement embodying herein wherein such at least one holder means is also for holding a removable bottom to such container means; and wherein such at least one holder is also structured and arranged to hold a removable bottom to such container). Under appropriate circumstances other arrangements may suffice. Bottom 136 will be further detailed in FIG. 5 and FIGS. 18–20. Reference is now made to FIG. 3. FIG. 3 is a top view of the utensil cooling system 100 of FIG. 1 according to a preferred embodiment of the present invention. This top view further illustrates the preferred shape of the present embodiment. Another feature of the present embodiment of utensil 102 is a temperature sensor and display 144 (embodying herein a temperature sensor and display means for displaying the temperature of the substance; and embodying herein a temperature sensor and display structured and arranged to display the temperature of the substance). Preferably, temperature sensor and display 144 is attached in the bottom center portion 146 of central bowl 120, as shown (this arrangement embodying herein wherein such temperature sensor and display is structured and arranged to be placed at about the bottom of such bowl). Preferably, the temperature sensor and display 144 comprises a thin plastic 146 (shown in FIG. 6 and FIG. 9), such as Lexan® with a thermo-sensitive ink 148 applied on the underside 150 and adhesive 152 applied over the thermo-sensitive ink 148. In the illustrated embodiment, the ink preferably resembles a snowflake 154 (embodying herein wherein such temperature sensor and display resembles a snowflake). The temperature sensor and display 144 is further detailed in FIG. 6 and FIG. 9.

Figure 4:
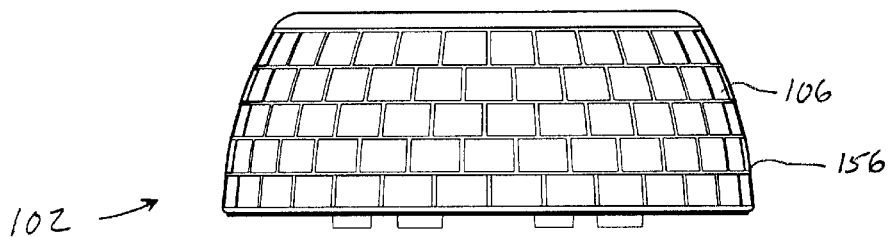
FIG. 4 is a side view of the utensil cooling system of FIG. 1 according to a preferred embodiment of the present invention.

FIG. 4 is a side view of the utensil cooling system 100 of FIG. 1 according to a preferred embodiment of the present invention. As described above and further illustrated in FIG. 4, utensil 102 comprises exterior indicia 106 which may be used to make the utensil 102 more desirable to a buyer or user, such as an igloo design 156, as shown. The indicia 106 may also be utilized for advertising purposes.

Figure 5:
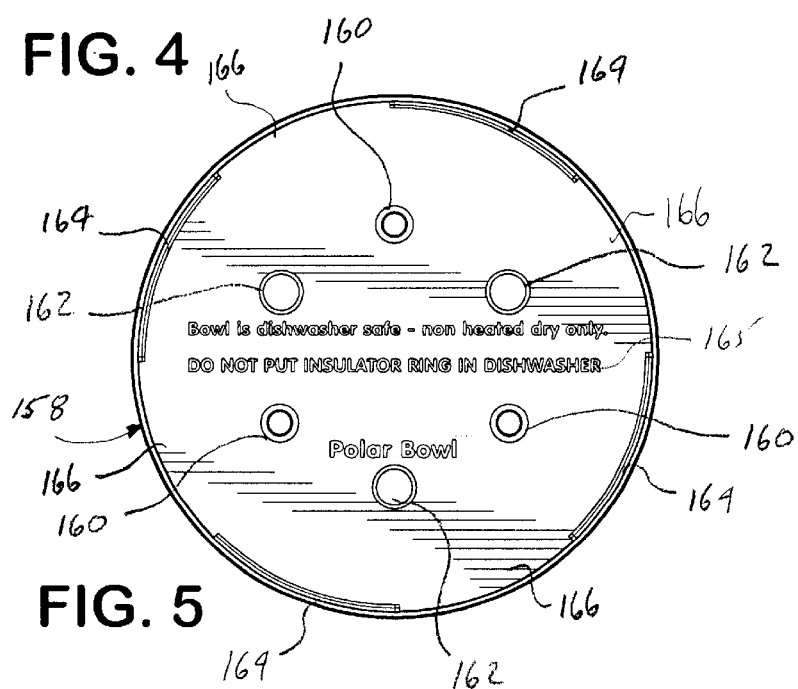
FIG. 5 is a bottom view of the utensil cooling system of FIG. 1 according to a preferred embodiment of the present invention.
Figure 6:
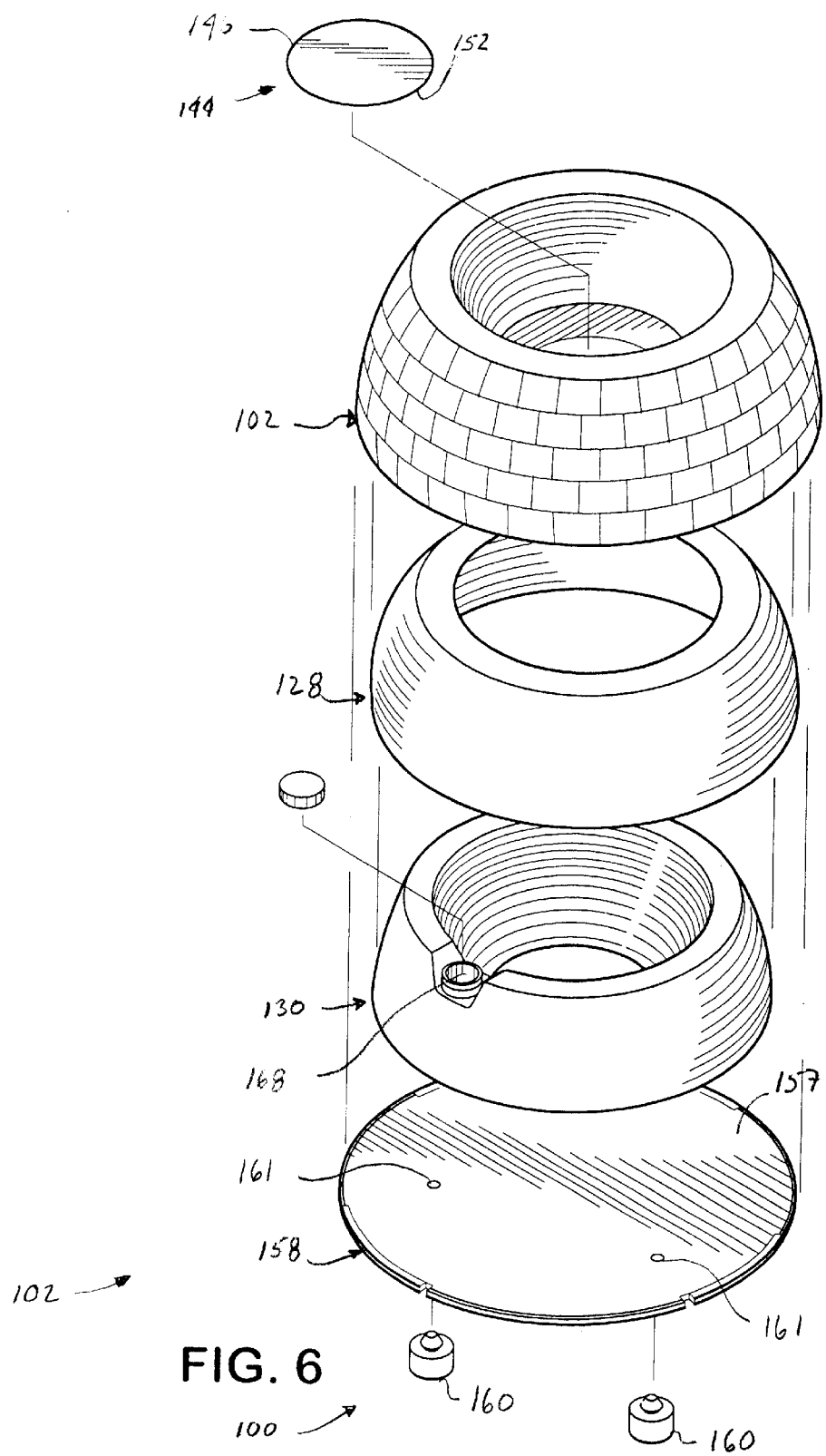
FIG. 6 is an exploded perspective view of the utensil cooling system of FIG. 1 according to a preferred embodiment of the present invention.

FIG. 5 is a bottom view of the utensil cooling system 100 of FIG. 1 according to a preferred embodiment of the present invention. Preferably, bottom 158 comprises a circular, preferably solid, generally disk-shaped structure, as shown. Further, bottom 158 comprises feet 160 and finger holes 162 (embodying herein wherein such at least one holder further comprises at least one grip structured and arranged to assist gripping such removable bottom; and wherein such at least one holder means further comprises gripping means for assisting gripping such removable bottom). Preferably, and as also shown in FIG. 6, feet 160 are inserted into small apertures 161 in the bottom 158, as shown. Preferably, the feet 160 are rubber; however, under appropriate circumstances other materials may suffice. The feet 160 assist in preventing the utensil 102 from lateral movement. Preferably, bottom 158 attaches to utensil 102 at the underside of the outer shell 108, as shown. Preferably, bottom 158 also comprises a plurality of alternating tabs 166 and 170 (tab 170 shown in FIGS. 18–21). Preferably, tabs 166 and 170 are utilized to attach bottom 158 to the underside of the outer shell 108 (this arrangement embodying herein attachment means for removably attaching such removable bottom to such container means; and an attacher structured and arranged to removably attach such removable bottom to such container). The tabs 166 and 170 will be further detailed below when discussing FIGS. 18–21. In addition, bottom 158 preferably comprises indicia 165 (embodying herein wherein such removable bottom comprises indicia). Such indicia 165 are preferably used to indicate special instructions, as shown, including, for example, product name, registration and other pertinent information (for example, washing instructions and a patent pending mark or patent number).

FIG. 6 is an exploded perspective view of the utensil cooling system 100 of FIG. 1 according to a preferred embodiment of the present invention. Preferably, utensil 102 comprises outer shell 108, insulator 128, cooling container 130 and bottom 158, as shown. Preferably, cooling container 130 is toroidal in shape, as shown. Preferably, insulator 128 is structured and arranged such that it stacks on top of cooling container 130 such that insulator 128 is nested and closely fitted over cooling container 130, as shown, particularly in FIG. 2. Preferably, outer shell 108 is structured and arranged such that it stacks on top of insulator 128 such that outer shell 108 is nested and closely fitted over insulator 128, as shown. Preferably, insulator 128 is adjacent the outer shell 108 and between the outer shell 108 and the cooling container 130 (this arrangement embodying herein wherein such substantially toroidal insulating means is substantially nested adjacent such inner portion; and such substantially toroidal cooling means is substantially nested adjacent such substantially toroidal insulating means; and embodying herein wherein such substantially toroidal insulator is substantially nested adjacent such inner portion; and such substantially toroidal cooler is substantially nested adjacent such substantially toroidal insulator). Under appropriate circumstances, other arrangements may suffice. The above-described arrangement of the toroidal insulator 128 and toroidal cooling container 130 provide longer lasting and more improved cooling for the utensil 102. As will be further detailed below, using this described embodiment, a quart of water may be typically kept cooled by 50 ounces of freezable coolant for a period of about 10 hours with an outside temperature of about 100 degrees Fahrenheit.

Figure 7:
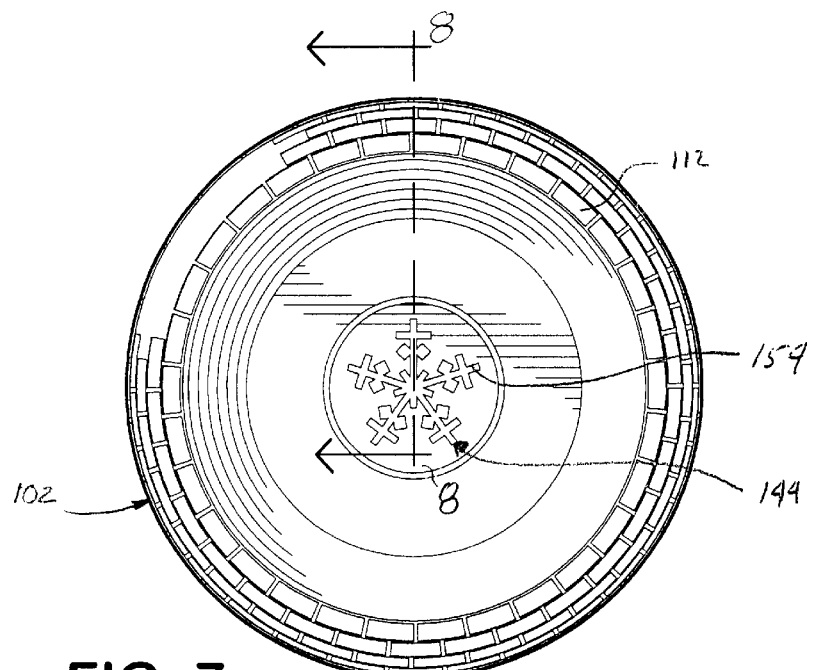
FIG. 7 is a top view of the utensil cooling system of FIG. 6 according to a preferred embodiment of the present invention.
Figure 8:
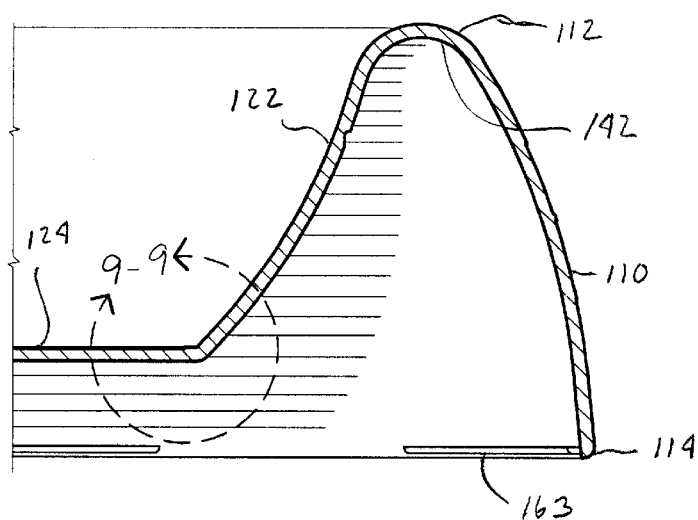
FIG. 8 is a sectional view through the section 8—8 of FIG. 7.
Figure 9:
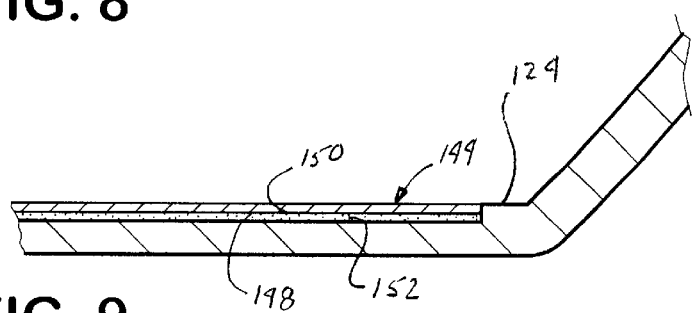
FIG. 9 is an enlarged detail view through the section 9—9 of FIG. 8.

FIG. 7 is a top view of the utensil cooling system 100 of FIG. 6 according to a preferred embodiment of the present invention. FIG. 8 is a sectional view through section 8—8 of FIG. 7. FIG. 9 is an enlarged detail view through section 9—9 of FIG. 8. These figures more clearly illustrate the outer shell 108 and central bowl 120, along with the interior sloping sides 122 and flat bottom 124. Preferably, the outer shell 108 and central bowl 120 are ·dishwasher safe·, however, the applicant does not recommend use of a heating cycle for drying the preferred embodiment. Further, FIG. 9 illustrates a preferred arrangement of the temperature sensor and display 144. As described above, the temperature sensor and display 144 comprises a thin plastic 146, such as Lexan®, coated with a thermo-sensitive ink 148 applied on the underside 150 of the plastic and a layer of adhesive 152 applied over the thermo-sensitive ink 148. In the illustrated embodiment, the thermo-sensitive ink 148 is applied in such manner that it preferably resembles a snowflake 154, as shown. Preferably, the thermo-sensitive ink 148 on the snowflake 154 will become translucent when the contents, such as water, reach a set temperature, preferably indicating the contents require additional cooling.

Figure 10:
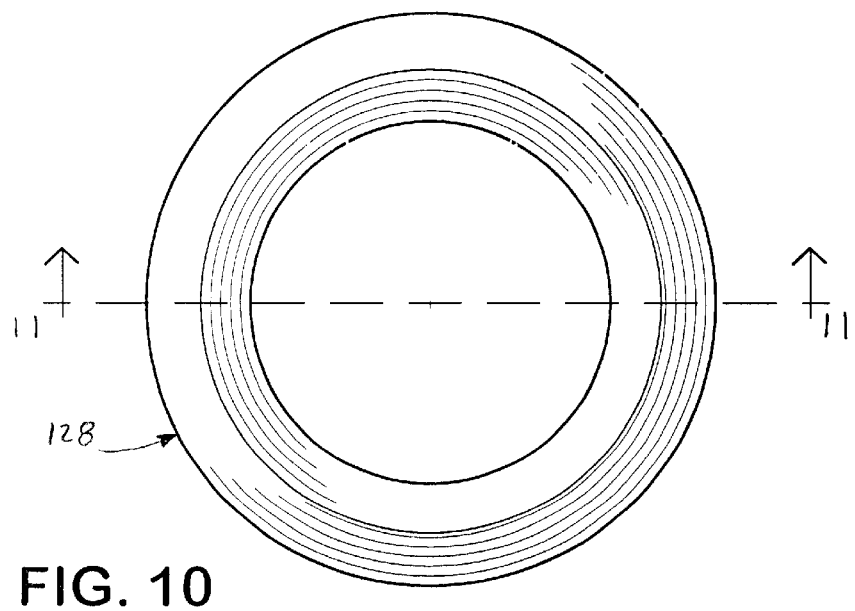
FIG. 10 is a top view of the insulator of the utensil cooling system of FIG. 6 according to a preferred embodiment of the present invention.
Figure 11:
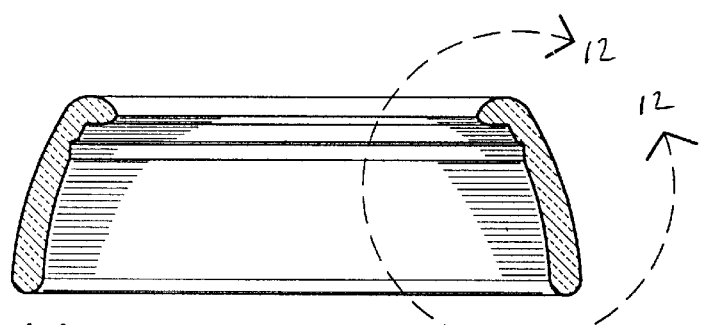
FIG. 11 is a sectional view through the section 11—11 of FIG. 10.
Figure 12:
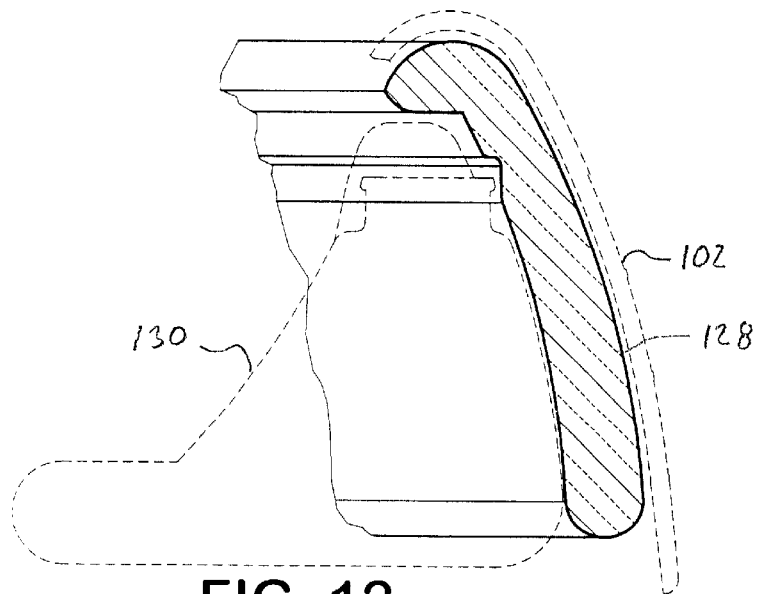
FIG. 12 is a sectional view through the section 12—12 of FIG. 11.

FIG. 10 is a top view of the insulator 128 of the utensil cooling system 100 of FIG. 6 according to a preferred embodiment of the present invention. FIG. 11 is a sectional view through the section 11—11 of FIG. 10. FIG. 12 is a sectional view through the section 12—12 of FIG. 11. Preferably, the insulator 128 is a toroidal shape, as shown. Preferably, the insulator 128 is made from polystyrene foam such as Styrofoam® and is about one-half to one-inch in thickness (embodying herein wherein such substantially toroidal insulator comprises polystyrene; and embodying herein such substantially toroidal insulator comprises a thickness of about one-half to about one inch thick polystyrene). Under appropriate circumstances, other arrangements may suffice. Preferably, insulator 128 is structured and arranged such that it is formed (as shown in FIG. 12) to follow the contours of the cooling container 130.

FIG. 13 is a top view of the cooling container 130 of the utensil cooling system 100 of FIG. 6 according to a preferred embodiment of the present invention. FIG. 14 is a bottom view of the cooling container 130 of the utensil cooling system 100 of FIG. 13 according to a preferred embodiment of the present invention. FIG. 15 is a side view of the cooling container 130 of the utensil cooling system 100 of FIG. 13 according to a preferred embodiment of the present invention. FIG. 16 is a sectional view through the section 16—16 of FIG. 13. FIG. 17 is an enlarged detail view through the section 9—9 of FIG. 16. As illustrated, cooling container 130 is preferably a toroidal-shaped hollow-enclosed reservoir, as shown. Preferably, cooling container 130 comprises an opening 168, used to fill the cooling container 130, as shown. Preferably, opening 168 is slightly lower than the top 170 of the cooling container 130, preferably about one-half inch lower. This arrangement provides for an air-gap 172 within the reservoir 132 (see FIG. 2), which allows room for expansion of the coolant 134. When coolant 134 is water, such an expansion is required to avoid undue stress on the cooling container 130, for example, when water freezes and expands. Preferably, the cooling container 130 is positioned on a level surface while being filled with coolant 134 such that the cooling container 130 will not be overfilled and the air-gap 172 reduced (the above described arrangement embodying herein wherein such fill-opening is located below a top portion of such substantially toroidal cooler such that when such substantially toroidal cooler is placed on a level surface and such reservoir is filled with such freezable coolant, to the top of such fill-opening, an air space remains in such reservoir). Preferably, the opening 168 has a neck portion 178 and closure means such as cap 174 (this arrangement embodying herein wherein such substantially toroidal cooling means comprises a removable seal means for removably sealing such reservoir means; and embodying herein wherein such substantially toroidal cooler comprises a removable seal structured and arranged to removably seal such reservoir; and further embodying herein wherein such substantially toroidal cooler comprises a fill opening with a removable seal for removably sealing such fill-opening). Preferably, cap 174 snaps onto opening 168, as shown; however, under appropriate circumstances other arrangements may suffice. Preferably, cooling container 130 has a center opening 176, as shown. Preferably, this center opening 176 provides both for the temperature sensor and display 144 to function more accurately (as a freezing substance is not located directly below) and for the improved cooling of the utensils. Preferably, the coolant reservoir 132 holds about 50 ounces of coolant 134. Preferably, the weight of the coolant 134 also adds enough additional weight to the utensil 102 to assist in preventing the utensil 102 from sliding around, for example, when being used by a pet 104, for example, a dog, as shown. Under appropriate circumstances other arrangements may suffice.

Figure 21:
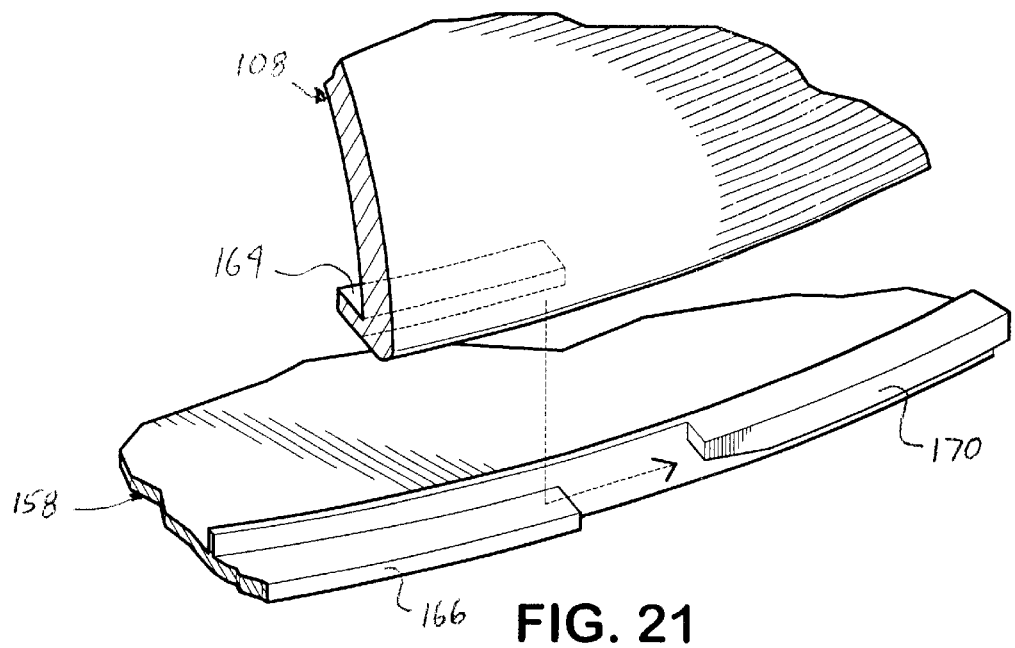
FIG. 21 is a perspective view, partially in section illustrating the connection of the bottom plate to the outer bowl of the Utensil cooling system according to a preferred embodiment of the present invention.

FIG. 18 is a top view of the bottom plate 158 of the utensil cooling system 100 of FIG. 6 according to a preferred embodiment of the present invention. FIG. 19 is a bottom view of the bottom plate 158 of the utensil cooling system 100 of FIG. 13 according to a preferred embodiment of the present invention. FIG. 20 is a side view of the bottom plate 158 of the utensil cooling system 100 of FIG. 13 according to a preferred embodiment of the present invention. FIG. 21 is a perspective view, partially in section illustrating the connection of the bottom plate 158 to the outer shell 108 of the utensil cooling system 100 according to a preferred embodiment of the present invention.

Preferably, bottom plate 158 is used to hold cooling container 130 and insulator 128 in place. Further bottom plate 158 assists in insulating and protecting the cooling container 130 and insulator 128 from the elements. As an added embodiment, insulation, such as polystyrene foam, may be added to the top 157 of bottom plate 158 for further insulating the components. Preferably, tabs 170 and 166 are utilized to attach bottom plate 158 to the underside of the outer shell 108. Preferably, outer shell 108 comprises tabs 164, as shown. Preferably, there are four such tabs 164 spaced about equally apart and arranged to be placed adjacent tabs 166 and turned, in a preferably clockwise direction, such that tabs 164 will slide beneath tabs 170, thereby securing the bottom plate 158 to the underside of the outer shell 108, as shown. Preferably, finger holes 162 are used to grab the bottom plate 158 while turning or twisting the bottom plate 158. Preferably, tabs 170 further comprise a tapered end 174 to facilitate the tabs 164 more easily sliding beneath tabs 170, as shown. Even further, preferably, tabs 166 comprise a stop 172, which provides a stopping point for tabs 164 when they are slid under tabs 170, as shown (see FIG. 20). Under appropriate circumstances other arrangements may suffice. (The above described arrangement embodies herein wherein such attacher further comprises: at least one first tab attached to an underside of such container; at least one second tab attached to such removable bottom; and at least one third tab attached to such removable bottom; wherein such at least one second tab and such at least one third tab are structured and arranged to allow such at least one first tab to be inserted between such at least one second tab and such at least one third tab; wherein twisting of such removable bottom causes such at least one first tab to slide below such at least one second tab and above such at least one third tab; and wherein such removable bottom is held in place and removably attached to such container.)

Preferably, the bottom plate 158 is removed by reversing the above-described installation and simply grabbing the bottom plate 158 by utilizing the finger holes 162 and twisting the bottom plate 158 in a counterclockwise direction until the tabs 164 have cleared the tabs 170. Under appropriate circumstances other arrangements may suffice. The illustrated preferred embodiment shows a holder means for containing the cooling means and/or the insulator means, including a closed upper portion, nesting arrangements, bottom support etc., embodying herein at least one holder means. Other alternate but presently less preferred ways to contain or hold a cooling means according to the present invention, might, under appropriate circumstances, include snap tolerances, snap rings, side seams, etc.

In operation, the utensil cooling system 100 is preferably sold intact. In a preferred embodiment, a set of directions preferably accompanies the utensil 102. Preferably, a user removes the bottom plate 158 and removes the cooling container 130. Next, the cap 174 is removed from the cooling container 130. Preferably, the cooling container is placed on a level surface with the cap 174 facing upwards and the reservoir 132 is filled with coolant 134, preferably water, until the coolant 134 is at the base 184 (see FIG. 16) of the neck 174. The cap 174 is then placed onto the neck 174 and secured in place. Preferably, the cooling container 130 is then placed in a freezer. When the coolant 134 is frozen, the cooling container 130 is then removed from the freezer and placed into the utensil 102. The bottom plate 158 is then attached to the outer shell. The utensil 102 is now ready to cool whatever contents are placed within it. In the illustrated embodiment, water is placed in the central bowl 120 portion. Preferably, the cold temperature activates the temperature sensor and display 144, in this embodiment a snowflake 154, and the thermo-sensitive ink 148 will show as a color. Preferably, as an example, when the water reaches a transitional temperature (preferably, no more than about 75 degrees Fahrenheit) the thermo-sensitive ink 148 will become colorless, thereby indicating it is time to change the cooling container. Preferably, a second cooling container 130 is used as a back-up and kept in a freezable state such that a quick exchange of cooling containers may take place.

Preferably, the utensil 102 may be cleaned either by traditional cleaning-wiping means or by cleaning the entire utensil 102 in a dishwasher. When a dishwasher is preferred, the preferred method is accomplished by removing the bottom plate 158, removing the cooling container 130 and removing the insulator 128 from the outer shell 108. Preferably, the utensil may then be placed in a dishwasher and cleaned. Preferably, the utensil is air-dried and not heat-dried.

Figure 22:
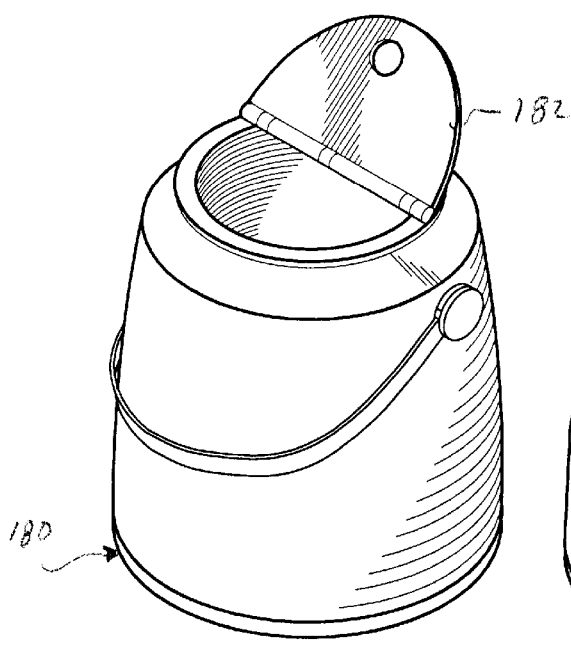
FIG. 22 is a perspective view of a bait holder according to another preferred embodiment of the present invention.
Figure 23:
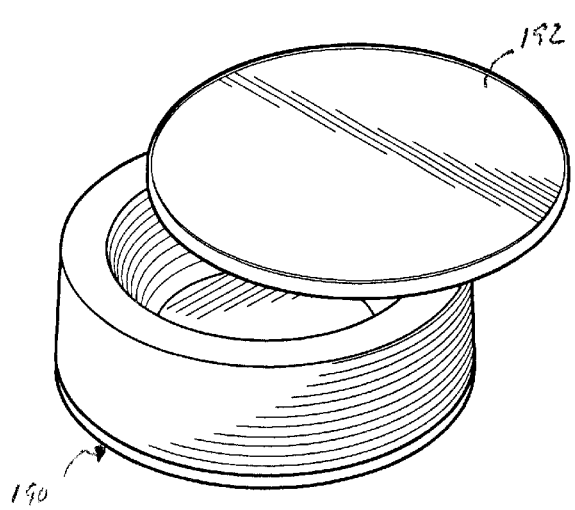
FIG. 23 is a perspective view of a food-cooling dish according to another preferred embodiment of the present invention.

FIG. 22 is a perspective view of a bait holder according to another preferred embodiment of the present invention. FIG. 23 is a perspective view of a food-cooling dish according to another preferred embodiment of the present invention. Preferably, the utensil cooling system 100 may comprise additional embodiments such as a cooler 180 or food holder dish 190. Preferably, cooler 180 may be used to hold bait, for example. Preferably, food holder dish 190 may be used to hold salad or other food, for example. Preferably, the toroidal shapes and stacking arrangements described and shown above apply and are utilized in these examples of other shapes in which the utensil cooling system 100 may apply. Preferably, such cooler 180 may also comprise a lid 182, and such food holder dish 190 may also comprise a lid 192 to further add to the insulation of the contents. Under appropriate circumstances other arrangements may suffice.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A cooling system for cooling a substance contained by a utensil comprising, in combination:
   a) a substantially toroidal cooling means for cooling the substance;
   b) a unitary container means, comprising an outer portion and an inner portion, for containing the substance within said outer portion and containing said substantially toroidal cooling means within said inner portion; and
   c) at least one holder means, for holding said substantially toroidal cooling means within said inner portion of said container means;
   d) an enclosure means for enclosing said toroidal cooling means;
   e) wherein said enclosure means is formed by removably fastening said at least one holder means to said unitary container means.

2. The cooling system according to claim 1 further comprising:
   a) a substantially toroidal insulating means for insulating said inner portion from said outer portion;
   b) wherein said enclosure means is also for enclosing said substantially toroidal insulating means.

3. The cooling system according to claim 2 wherein:
   a) said substantially toroidal insulating means is substantially nested adjacent said inner portion within said enclosure means; and
   b) said substantially toroidal cooling means is substantially nested adjacent said substantially toroidal insulating means within said enclosure means.

4. The cooling system according to claim 3 further comprising a temperature sensor and display means for displaying the temperature of the substance.

5. The cooling system according to claim 1 further comprising a temperature sensor and display means for displaying the temperature of the substance.

6. The cooling system according to claim 1 wherein said substantially toroidal cooling means comprises a reservoir means for containing a freezable coolant.

7. The cooling system according to claim 6 wherein said substantially toroidal cooling means comprises a removable seal means for removably sealing freezable coolant within said reservoir means.

8. The cooling system according to claim 2 wherein said at least one holder means comprises a removable bottom to said container means.

9. The cooling system according to claim 8 further comprising attachment means for removably attaching said removable bottom to said container means.

10. The cooling system according to claim 9 wherein said removable bottom further comprises gripping means for assisting gripping said removable bottom.

11. The cooling system according to claim 2 wherein said substantially toroidal insulating means is removably contained within said enclosure means.

12. The cooling system according to claim 1 wherein said substantially toroidal cooling means is removably contained within said enclosure means.

13. A cooling system for cooling a substance contained by a utensil comprising, in combination:
   a) a substantially toroidal cooler structured and arranged to cool the substance;
   b) a unitary container, comprising an outer portion and an inner portion, structured and arranged to contain the substance within said outer portion and contain said substantially toroidal cooler within said inner portion; and
   c) at least one holder, structured and arranged to hold said substantially toroidal cooler within said inner portion of said container;
   d) an enclosure to enclose said toroidal cooler;
   e) wherein said enclosure is formed by removably fastening said at least one holder to said unitary container.

14. The cooling system according to claim 13 further comprising:
   a) a substantially toroidal insulator structured and arranged to insulate said inner portion from said outer portion;
   b) wherein said enclosure is structured and arranged to enclose said substantially toroidal insulator.

15. The cooling system according to claim 14 wherein:
   a) said substantially toroidal insulator is substantially nested adjacent said inner portion within said enclosure; and
   b) said substantially toroidal cooler is substantially nested adjacent said substantially toroidal insulator within said enclosure.

16. The cooling system according to claim 15 further comprising a temperature sensor and display structured and arranged to display the temperature of the substance.

17. The cooling system according to claim 16 wherein said outer portion comprises a bowl having a bowl bottom.

18. The cooling system according to claim 17 wherein said temperature sensor and display is structured and arranged to be placed at about said bowl bottom.

19. The cooling system according to claim 18 wherein said temperature sensor and display resembles a snowflake.

20. The cooling system according to claim 13 further comprising a temperature sensor and display structured and arranged to display the temperature of the substance.

21. The cooling system according to claim 13 wherein said substantially toroidal cooler comprises a reservoir structured and arranged to contain a freezable coolant.

22. The cooling system according to claim 21 wherein said freezable coolant comprises water.

23. The cooling system according to claim 21 wherein said freezable coolant comprises a freezable gel.

24. The cooling system according to claim 21 wherein said substantially toroidal cooler comprises a removable seal structured and arranged to removably seal freezable coolant within said reservoir.

25. The cooling system according to claim 21 wherein said reservoir is capable of holding about 50 ounces of freezable coolant.

26. The cooling system according to claim 21 wherein said substantially toroidal cooler comprises a fill opening with a removable seal for removably sealing said fill-opening.

27. The cooling system according to claim 26 wherein said fill-opening is located below a top portion of said substantially toroidal cooler such that when said substantially toroidal cooler is placed on a level surface and said reservoir is filled with said freezable coolant, to the top of said fill-opening, an air space remains in said reservoir.

28. The cooling system according to claim 13 wherein said at least one holder is structured and arranged to hold a removable bottom to said container.

29. The cooling system according to claim 28 further comprising an attacher structured and arranged to removably attach said removable bottom to said container.

30. The cooling system according to claim 29 wherein said removeable bottom further comprises at least one grip structured and arranged to assist gripping said removable bottom.

31. The cooling system according to claim 14 wherein said substantially toroidal insulator is removably contained within said enclosure.

32. The cooling system according to claim 31 wherein said substantially toroidal cooler is removably contained within said enclosure.

33. The cooling system according to claim 29 wherein said attacher further comprises:
 a) at least one first tab attached adjacent an underside of said container;
 b) at least one second tab attached to said removable bottom; and
 c) at least one third tab attached to said removable bottom;
 d) wherein said at least one second tab and said at least one third tab are structured and arranged to allow said at least one first tab to be inserted between said at least one second tab and said at least one third tab;
 e) wherein twisting of said removable bottom causes said at least one first tab to slide below said at least one second tab and above said at least one third tab; and
 f) wherein said removable bottom is held in place and removably attached to said container.

34. The cooling system according to claim 14 wherein said substantially toroidal insulator comprises polystyrene.

35. The cooling system according to claim 13 wherein said outer portion comprises indicia.

36. The cooling system according to claim 35 wherein said indicia resembles an igloo.

37. The cooling system according to claim 13 wherein said at least one holder comprises indicia.

38. The cooling system according to claim 29 wherein said removable bottom comprises indicia.

39. A cooling system for cooling water contained by a pet dish comprising, in combination:
 a) a container, comprising,
  i) an outer portion having a bowl, and
  ii) an inner portion;
 b) a substantially toroidal insulator;
 c) a substantially toroidal cooler, comprising,
  i) a reservoir, and
  ii) a fill-opening with a removable seal for removably sealing said fill-opening,
  iii) wherein said fill-opening is located below a top portion of said substantially toroidal cooler such that when said substantially toroidal cooler is placed on a level surface and said reservoir is filled with said freezable coolant, to the top of said fill-opening, an air space remains in said reservoir; and
 d) at least one removable bottom structured and arranged to removably hold said substantially toroidal insulator and said substantially toroidal cooler within said inner portion of said container;
 e) wherein said substantially toroidal insulator is substantially nested adjacent said inner portion, and said substantially toroidal cooler is substantially nested adjacent said substantially toroidal insulator.

40. The cooling system according to claim 39 wherein:
 a) said bowl holds about a quart of the water;
 b) said substantially toroidal insulator comprises a thickness of about one-half to about one inch thick polystyrene; and
 c) wherein said reservoir is capable of holding about 50 ounces of a freezable coolant.

41. The cooling system according to claim 40 wherein said removable bottom further comprises:
 i) at least one first tab attached to an underside of said container,
 ii) at least one second tab attached to said removable bottom, and
 iii) at least one third tab attached to said removable bottom;
 iv) wherein said at least one second tab and said at least one third tab are structured and arranged to allow said at least one first tab to be inserted between said at least one second tab and said at least one third tab;
 v) wherein twisting of said removable bottom causes said at least one first tab to slide below said at least one second tab and above said at least one third tab; and
 vi) wherein said removable bottom is held in place and removably attached to said container.

* * * * *